United States Patent [19]
Nelson et al.

[11] 3,898,586
[45] Aug. 5, 1975

[54] COAXIAL SHORT PULSED LASER

[75] Inventors: Melvin A. Nelson; Terence J. Davies, both of Santa Barbara, Calif.

[73] Assignee: The United States of America as represented by the United States Energy Research and Development Administration, Washington, D.C.

[22] Filed: Jan. 8, 1974

[21] Appl. No.: 431,817

[52] U.S. Cl. ........ 331/94.5 G; 331/94.5 D; 330/4.3; 313/210; 313/217; 313/223; 313/224
[51] Int. Cl. ........................... H01s 3/22; H01s 3/09
[58] Field of Search ..................... 331/94.5; 330/4.3; 313/210, 217, 223, 224

[56] References Cited
OTHER PUBLICATIONS
Boersch et al., Zeitschrift for Naturforschung, Vol., 27a, Nos. 8/9 August/September 1972, pp. 1264–1271. Avail. Sci. Library, Q3Z4.

*Primary Examiner*—Robert J. Webster
*Attorney, Agent, or Firm*—John A. Horan; John A. Koch

[57] ABSTRACT

A ruggedized laser system capable of producing, in a field environment, light pulses on the order of 350 psec duration with a beam divergence on the order of 30 milliradians and a predictability in time generation within 1 nsec. The laser itself is a coaxial design with each of a pair of axially aligned longitudinally spaced apart electrodes conductively connected to one of the conductors of a coaxial cable. An axially aligned optical mirror and window pair are mounted on the electrodes. The length of the cable is selected to provide voltage doubling of the pulse applied to the cable in the discharge across the electrode pair. A volume of a gas lasing medium maintained between the electrode pair is replenished from a reservoir attached to the laser head. A solid potting material fills the space between the axially aligned components and the housing of the laser.

14 Claims, 1 Drawing Figure

PATENTED AUG 5 1975 3,898,586
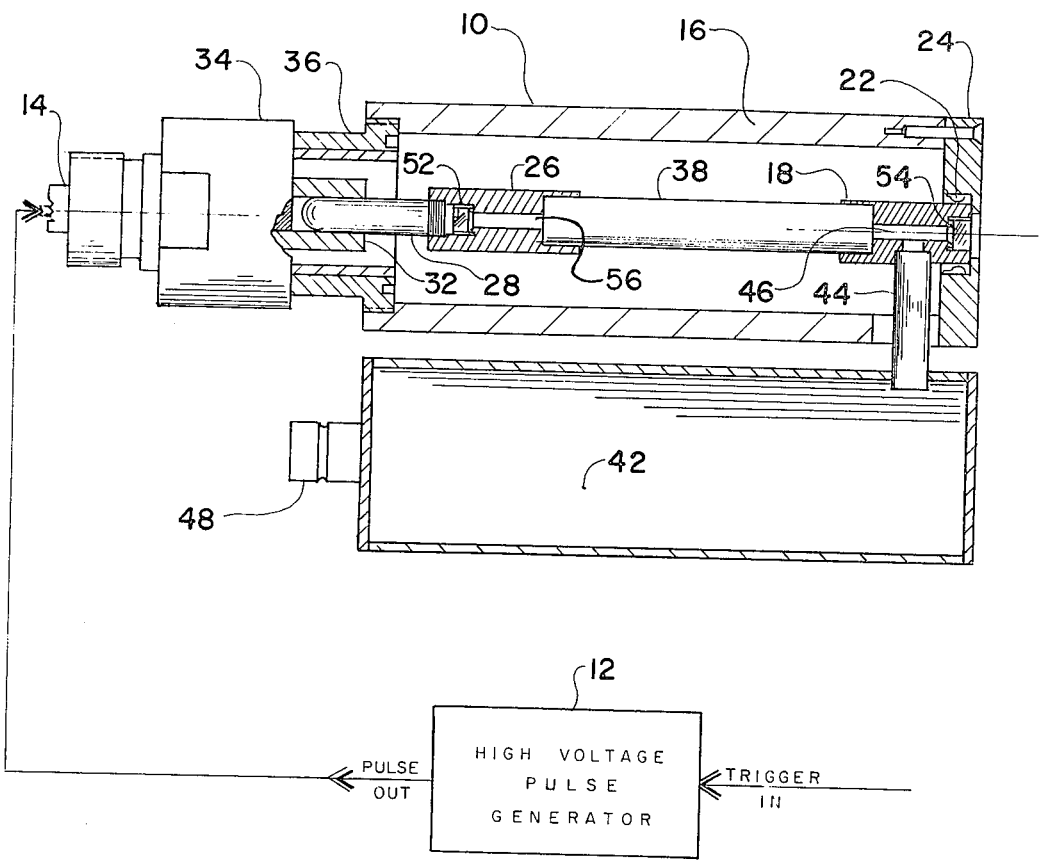

COAXIAL SHORT PULSED LASER

BACKGROUND OF THE INVENTION

The invention described herein was made in the course of or under Contract AT(29-1)-1183 with the U.S. Atomic Energy Commission.

This invention relates to a system for producing light pulses and more particularly to a ruggedized system for producing light pulses of short duration and low beam divergence which possesses the capacity for a predictability in time generation well within 1 nanosecond (nsec).

Recent years have experienced a growing need for the development of a system for producing light pulses to be utilized in the acquisition and analysis of data on extremely fast, singly occurring phenomena which have a bandwidth greater than one gigahertz (GHz). One such need developed in connection with the "Fast Data Acquisition System" of U.S. Pat. Application Ser. No. 431,809, now U.S. Pat. No. 3,867,627, issued Feb. 18, 1975 in the names of Melvin A. Nelson, Terence J. Davies and John C. Clark, as joint inventors and co-assignors to the assignee of the instant application.

Very briefly, the data acquisition system of that application includes applying a transient electrical pulse produced in connection with the phenomenon under investigation as a traveling wave to a longitudinally extending electro-optical modulator through which it proceeds at a velocity characteristic of the modulator. Short light pulses are transmitted to a plurality of locations along one side of the modulator and the modulated light pulses which pass through the modulator are received on the opposite side. Since the intensity of each light pulse received at the opposite side is a function of the intensity of the transient pulse at that particular location, the plurality of pulses received at the opposite side can be utilized to provide data points in the reconstruction of amplitude values versus time for the transient electrical signal.

It will be appreciated that the characteristics of the light pulses applied to the modulator will to a great measure determine the fidelity of the data points obtained vis a vis the true intensities (and times of their occurrence) along the transient pulse. In view of the one GHz sampling frequency of interest and other constraints imposed by other components of the sampling system, the light pulses were required to have the following properties:
  1. Pulse duration FWHM of 350 picoseconds (psec), or less,
  2. Beam divergence of less than 100 milliradians,
  3. Peak power greater than 10 watts,
  4. Monochromatic spectral output compatible with light detectors which receive the modulated pulses, and
  5. Predictability in the time of their generation to within 1 nsec.

Moreover, the light pulse source utilized with the described data acquisition system had to be a rugged, compact piece of equipment capable of providing reliable performance under field conditions which may include placement in a drill hole thousands of feet below the surface of the earth.

No known light source could meet all of the above requirements. Noncoherent light sources, such as xenon flash tubes, are unsatisfactory. Their pulse length is far too long, their optical intensity is very inadequate at the needed beam geometry and they are not monochromatic. Semiconductor emitters and lasers have too great a beam divergence and too long a pulse duration. Solid state lasers have too great a time jitter in both Q-switched and mode-locked configurations and are much too large and bulky and require delicate alignment. Available gas lasers either have pulse durations greater than 350 psec, are not reproducible in time or, as in the case of mode-locked devices, are difficult to pulse predictably within a 1 nsec. time uncertainty. In addition, they are generally physically large and mechanically fragile and may require frequent alignment.

In this connection, the experimental coaxial nitrogen laser system reported in the article entitled "Stimulated Emission from Organic Dye Solutions Pumped by a Small Coaxial $N_2$ Laser" is of interest. That article appeared on page 1725 of Vol. 9, No. 7, July 1970 issue of APPLIED OPTICS MAGAZINE and was authored by John C. Clark, a coinventor in the above referenced application to the sampling system, and T. J. Davies, coinventor in both the above referenced and instant applications. While that coaxial nitrogen laser system provided light pulses that approached the above requirements, it fell short of meeting them. The pulse width was too large by a factor of about 3. It was fragile, subject to electrical breakdowns, had a lasing lifetime that was too short, was unable to exhibit the needed pulse generation time stability, and the near-ultraviolet wavelength emitted using nitrogen gas was unsuitable, the modulator in the system referred to being opaque at that wavelength.

In view of the foregoing, we have invented a system for producing light pulses which meets or exceeds each of the demanding requirements set out above. It is rugged, compact and self-contained and generates light pulses with the following characteristics:
  1. Pulse duration 300–350 psec full width at half maximum (FWHM) intensity points,
  2. Wavelength of 614.3 nanometers with a line width of approximately 0.1 angstrom,
  3. Beam divergence of about 30 milliradians,
  4. Peak power intensity variation of less than 10% from pulse to pulse,
  5. Peak power output greater than 100 watts, and
  6. Total generation time uncertainty, including jitter, less than 1 nsec.

The light source itself is housed in a coaxial package and features sealed-in permanently-aligned optics. It is small enough to be easily hand-held and is suitable for normal, rugged use in a field environment.

SUMMARY OF THE INVENTION

Accordingly, it is an object of the invention to provide a system capable of producing under field conditions light pulses meeting exceedingly rigid requirements regarding pulse width, beam divergence, peak power, spectral output and time generation predictability. Briefly summarized, the above and additional objects and advantages are accomplished by a system including a gas laser of low impedance, coaxial design. Shaped metal electrodes of low work function material are positioned in the center of the coaxial arrangement and are longitudinally separated by a capillary tube containing a volume of the lasing agent. The active gas volume in the capillary tube is continually refreshed through diffusion of gas between the tube and a reservoir container which is attached to the laser assembly and maintained at electrical ground potential.

The forward one of the pair of electrodes is conductively connected to the outer housing which is in turn connected to the outer conductor of a coaxial cable. The rearward electrode is conductively connected to the inner conductor of the coaxial cable. The cable is selected to provide a two-way transmission time which results in voltage doubling of the electrical pulse applied to the cable in the discharge across the pair of electrodes. The length and diameter of the gas discharge path between the electrodes are selected to provide the required width of the light pulses.

The intensity and peak power output of the laser are determined primarily by capillary tube discharge diameter, the pressure of the laser gas, and the characteristics of the excitation pulse applied to the electrodes to produce laser breakdown. A high voltage thyratron tube discharging a 2700 pf capacitor charged to about 35 KV provides the excitation pulse of satisfactory shape upon being triggered on hard by a stable, fast rising pulse. The area between the outer coaxial case and inner electrode/capillary discharge assembly is potted with a solid, high dielectric strength epoxy compound. This provides the necessary rigidity to the normally fragile assemblage of optical components, enables reliable operation at high voltage over extended periods of time without electrical breakdowns and provides good heat transfer away from the laser to the outer housing.

The above recited object and additional objects and advantages of the invention and a understanding of the mode and means of attaining same briefly summarized above will appear after consideration of the following description of a preferred embodiment thereof.

BRIEF DESCRIPTION OF DRAWING

The single FIGURE of drawing is a partially in section, partially broken away, partially schematic representation of a light pulse generating system according to the invention.

DESCRIPTION OF PREFERRED EMBODIMENT

Referring now to the drawing, coaxial laser 10 is electrically connected to a high voltage pulse generator, represented by block 12, through a 50 ohm coaxial cable 14. Specific values, dimensions, materials, etc., recited herein in connection with this description of a preferred embodiment are those which were utilized in a specific application of the system to achieve an output of light pulses which possessed the characteristics itemized in the penultimate paragraph of the above Background Of The Invention. It will be appreciated by those skilled in the art as this description unfolds that changes, alterations, substitutions, etc. can be made within the spirit and scope of the invention as set out in the appended claims.

The laser itself includes cylindrical, metal outer housing 16, forward electrode 18, which is conductively connected to housing 16 through contact strip 22 and end 24, and rearward electrode 26. Rearward electrode 26 is conductively connected to the inner conductor of coaxial cable 14 through connection terminal 28 and inner conductor 32 of a standard, commercially available, 50 ohm coax connector 34. Since housing 16 is fastened onto the outer conductor 36 of connector 34, laser 10 is actually an extension of coax cable 14 with forward electrode 18 being conductively connected to the outer conductor and rearward electrode 26 being conductively connected to the inner conductor.

Quartz capillary discharge tube 38 which is mounted between electrodes 18 and 26 maintains a volume of a lasing gas between the electrodes. Capillary discharge tube 38 is in fluid flow communication with reservoir container 42 through conduit 44 and bore 46 in electrode 18. Valve 48 is provided on the reservoir to facilitate creation of a vacuum in discharge tube 38 and subsequent replacement thereof with the lasing medium which in the specific application referred to was neon gas at a pressure of from 10 to 4 Torr. Laser excitation time was shortest at a pressure near 4 Torr.

The axially aligned optical components of laser 10, i.e., quartz mirror 52 and quartz window 54, are mounted on rearward electrode 26 and forward electrode 18, respectively, by a suitable means such as one of the low vapor-pressure thermosetting epoxies which are in common use in vacuum applications. As shown in the drawing, mirror 52 is mounted from the rear of electrode 26 and window 54 from the front of electrode 18 and the optical path between the optical components includes bores 46 and 56 in electrodes 18 and 26, respectively. The laser is ruggedized for field applications by filling the space between the inner surface of housing 16 and the axially aligned components, i.e., the two electrodes, discharge tube 38 and conductor 28, with an opaque, solid, high dielectric strength potting material which is not shown on the drawing in order that the description of the other components might be simplified. It is also advantageous for the potting material to have good heat transfer characteristics and, in addition, be applied in liquid form. An epoxy compound which has been found to very satisfactorily meet these requirements is that obtainable from the Dexter Corporation under the trade name and numbers Hysol No. C9-4190 with No. H8-3485 hardener.

The pulse width of laser 10 with neon as the lasing medium is primarily a function of the length of the gas discharge path. A 4 cm long capillary tube 38 was found to be the optimum discharge path length for the Fast Data Acquisition System of the above referenced patent application. This length produces a 300–350 psec FWHM pulse at a suitably high peak power output. Although the length of the capillary tube can be decreased to make the pulse width more narrow, the peak power density of the output pulse also decreases. At a 3 cm discharge length, for example, the pulse was narrower than 300 psec but the output power was only marginally useful for application with the Fast Data Acquisition System.

Metal electrodes 18 and 26, machined to the appropriate shape for use in the laser, also contribute to the narrow FWHM of the laser pulse. For example, the shorter the electrodes the narrower the laser pulse. However, sputtering of the electrode material on the laser window and reflecting mirror increases as the length of the electrodes decreases. Therefore, electrode length was finally determined by the degree of sputtering on the optical surfaces that was considered tolerable. An electrode length of 1 cm was selected for an acceptable degree of sputtering over a sufficiently long use period of the laser.

As peak power output was found to increase with increasing excitation voltage amplitude, a high voltage thyratron tube, not shown, was used as the pulse source for high voltage pulse generator 12. Triggering the thyratron discharged a 2700 pf capacitor, not shown, charged to about 35 KV through the tube, generating the negative high voltage electrical output pulse of about 8 nsec rise time. Of course any pulse source such as, for instance, a spark gap device, which provides a pulse having the required characteristics would be satisfactory for use with pulse generator 12.

The 50 ohm cabe 14 which connects pulse generator 12 to laser 10 had a two-way transmission time of approximately 40 nsec. This time insures that the pulse voltage will remain on the laser and, due to its fast pulse rise time, that in addition the voltage will double at the laser until laser discharge occurs. Accordingly, whereas a 35 KV pulse is applied to cable 14 by pulse generator 12 a pulse of about 70 KV is seen between electrodes 18 and 26. Laser discharge occurs approximately 15 nsec. from the time the excitation pulse reaches maximum amplitude. Total short term jitter measured from a point on the trigger pulse to the thyratron tube of pulse generator 12 to a point in the laser output is less than 0.5 nsec. where the ambient temperature change is maintained within a 15°–20°F range. The thyratron of pulse generator 12 is triggered on hard by a stable, fast rising pulse of 1 KV peak amplitude such as may be produced by another thyratron tube operating at lower voltage, by a string of avalanche transistors discharged in series, by a spark gap discharge, or other appropriate means.

The shorter the time required to excite the laser into emission the more predictable is its lasing time. It is critically important that the lasing time be well known and stable to better than 1 nanosecond for successful operation of the Fast Data Acquisition System in obtaining data on signals whose total duration may be only a few nanoseconds. Three sets of parameters affect laser output timing:

1. Shape and amplitude of the excitation voltage pulse,
2. Type of electrode material used, and
3. Pressure of the neon gas lasing medium.

Excitation pulse shape and amplitude has been optimized by operating the thyratron of pulse generator 12 at its highest reliable anode voltage, by setting its reservoir voltage to its maximum practical value to give the fastest pulse rise time, and by providing for doubling of the pulse amplitude at the laser end of the interconnecting coaxial cable as previously related.

The material used for electrodes 18 and 26 has a great effect on the time predictability of lasing. With all other factors being the same, the jitter, or time uncertainty of lasing, attributable to the laser itself utilizing stainless steel was on the order of tens of nanoseconds whereas it was about one-half nanosecond utilizing aluminum. This is attributable to the work function of the electrode material, i.e., the relative ease with which the material gives up electrons. Accordingly, where very low jitter is required, such as in the Fast Data Acquisition System, the electrodes must be made from a material having a very low work function such as magnesium, aluminum or silver. Of these, the low cost, ready availability and machinability of aluminum makes it the most attractive. However, in those applications where a large jitter can be tolerated, electrodes of brass, copper or stainless steel having slightly higher work functions could provide satisfactory results depending, of course, upon particular requirements.

With respect to maintaining the pressure of the lasing medium, sealed-off gas storage reservoir 42 provides a number of advantages. The reservoir gas diffuses into the capillary tube and refreshes the discharge gas as needed thereby extending the useful life of the laser The reservoir is connected only to the low-electrical-potential (grounded) electrode to provide complete safety in handling. Vacuum seal-off valve 48 provided on the reservoir enables the lasing gas to be replenished extending the useful life of the laser by many times. In addition, for applications other than with the Fast Data Acquisition System, seal-off valve 48 would enable the lasing gas pressure to be changed and/or the gas itself changed to a different kind, making it possible to change the operating and output characteristics of the laser. For example, as previously described, filling the reservoir to about 4 Torr pressure using neon gas yields a subnanosecond width output pulse of about 100 watts peak power at a wavelength of 614.3 nanometers, whereas filling it to about 20 Torr pressure using nitrogen gas yields a 2–3 nanosecond wide pulse of about 10 kilowatts peak power at a wavelength of 337.1 nanometers.

Use of storage reservoir 42 makes it unnecessary to provide a continuously flowing gas supply or to use large tanks of gas with bulky pressure regulating controls. The storage reservoir also makes it practical to operate the laser at modest repetition rates (for example, 10 pulses per second) without requiring any elaborate cooling system. Normal air convection is sufficient.

The reliability of discharge is improved by firing the laser many times in an ageing process. The lifetime of the laser is also improved by using conventional outgassing techniques during vacuum pumpdown of the laser assembly.

Accordingly, the light pulse generating system according to the invention is a rugged system capable of producing a 300–350 psec pulse of 100 watts, or greater, amplitude at a low beam divergence that can be commanded to occur at an arbitrarily selected time within an accuracy of about 0.5 nsec. While the fundamental novel features of the invention have been shown and described and pointed out as applied to a particular embodiment by way of example, it will be appreciated by those skilled in the art that various omissions, substitutions and changes may be made within the principle and scope of the invention as expressed in the appended claims.

What we claim is:

1. A system for producing light pulses of short duration comprising:
   an outer cylindrical housing of an electrically conductive material,
   a pair of longitudinally spaced apart electrodes axially aligned within said housing,
   an optical window in the forward one of said pair and an optical mirror in the rearward, said window and said mirror being axially aligned for discharge of a light pulse in the forward direction,
   means for maintaining a volume of a gas lasing medium of a selected diameter at a selected pressure between said pair of electrodes in a manner whereby said lasing gas is continually refreshed by diffusion, said means including a reservoir external to said housing and a conduit connecting said reservoir with said space between said electrodes, means for conductively connecting said forward electrode to said housing, means for conductively connecting said housing to the outer conductor of a coaxial cable, means for conductively connecting said rearward electrode to the inner conductor of said coaxial cable, an essentially opaque, rigid, high dielectric strength potting material substantially filling the space within said housing not occupied by said axially aligned members, means for applying an electrical pulse of selected characteristics to said coaxial cable.

2. The system of claim 1 wherein said means for maintaining a volume of gas between the electrodes include a capillary tube.

3. The system of claim 2 including valve means on said reservoir for creating a vacuum in said reservoir and tube and for introducing a gas into said reservoir at a selected pressure.

4. The system of claim 3 wherein said gas is neon.

5. The system of claim 4 including neon in said reservoir at a pressure range from about 10 to 1 Torr.

6. The system of claim 5 wherein said pressure is about 4 Torr.

7. The system of claim 1 wherein said electrodes are of a material having a low work function.

8. The system of claim 7 wherein said electrode material is selected from the group consisting of magnesium, aluminum, silver, brass, copper and stainless steel.

9. The system of claim 8 wherein said electrodes are from about 1 cm to 5 cm in length.

10. The system of claim 7 wherein said volume is between about 2 cm long and 3 mm in diameter and between about 10 cm long and 0.5 cm in diameter.

11. The system of claim 10 wherein said electrical pulse applied to said coaxial cable is about 35 KV with a rise time of about 8 nsec. and the two-way transmission time of said cable is sufficiently long to provide voltage doubling of said electrical pulse discharged between said electrodes.

12. The system of claim 11 wherein said means for applying an electrical pulse includes a high voltage thyratron tube.

13. The system of claim 12 including means for triggering said thyratron on hard by a stable, fast rising pulse of about 1 KV peak amplitude.

14. The system of claim 2 wherein said conduit makes fluid flow communication with said tube through that one of said electrodes which is maintained at electrical ground potential.

* * * * *